United States Patent [19]

Damminger

[11] 4,283,449

[45] Aug. 11, 1981

[54] COMPOSITE MATERIAL WITH A CORE AND AN ADHERING COATING UNITED THERETO

[76] Inventor: Rudolf Damminger, Schulstrasse 11, 6781 Trulben, Fed. Rep. of Germany

[21] Appl. No.: 855,833

[22] Filed: Nov. 30, 1977

[30] Foreign Application Priority Data

Dec. 18, 1976 [DE] Fed. Rep. of Germany ....... 2657463

[51] Int. Cl.³ ............................................. B32B 15/08
[52] U.S. Cl. ................................ 428/72; 52/DIG. 7; 428/74; 428/218; 428/418
[58] Field of Search .................. 52/DIG. 7, DIG. 9; 428/2, 68, 256, 418, 31, 74, 911, 72, 218; 55/526

[56] References Cited

U.S. PATENT DOCUMENTS

| 2,454,307 | 11/1948 | Cooley | 428/49 X |
|---|---|---|---|
| 2,517,724 | 8/1950 | Schuh | 428/74 |
| 2,728,479 | 12/1955 | Wheeler | 428/116 X |
| 2,829,733 | 4/1958 | Bartels et al. | 428/131 X |
| 3,031,827 | 5/1962 | Onstad et al. | 428/137 X |
| 3,156,580 | 11/1964 | Howard | 428/418 X |
| 3,574,109 | 4/1971 | Yoshikawa | 428/198 X |
| 3,655,502 | 4/1972 | Yoshikawa | 428/152 X |
| 3,703,431 | 11/1972 | Kemper | 428/152 X |
| 3,733,675 | 5/1973 | Diederich | 428/2 X |

FOREIGN PATENT DOCUMENTS

7227537 11/1975 Fed. Rep. of Germany .

*Primary Examiner*—Henry F. Epstein
*Attorney, Agent, or Firm*—Orville N. Greene

[57] ABSTRACT

A composite material is formed with a porous core obtained by randomly folding or crumpling metal foils or filaments and has a coating adapted to strengthen the final product, of an adhering synthetic resinous material. Preferably, the core material is made more dense at the surface than at the interior as by hammering, pressing, striking, rolling, etc. To permit greater penetration of the resinous coating into the core, the core may be slit, punched or bored. The surface of the coating material may be further treated by fillers, painting, coating, vapor deposition, etc.

2 Claims, 2 Drawing Figures

U.S. Patent     Aug. 11, 1981     4,283,449
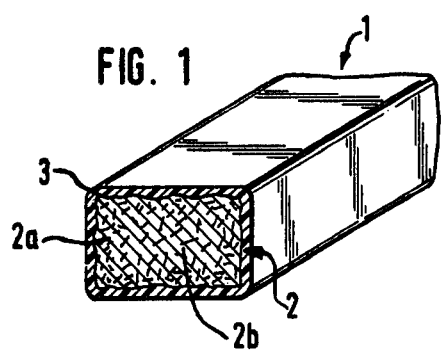
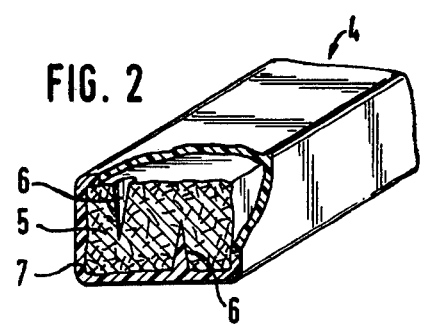

COMPOSITE MATERIAL WITH A CORE AND AN ADHERING COATING UNITED THERETO

The invention concerns a composite material with a core from porous material of low density and strength and a coating covering the whole or part of the surface which is adhesively bound to the core and of a material of higher density and strength than the core material.

Composite materials are useful in many technical areas. They consist, as a rule, of a core of a relatively light, often also sound or heat insulating material, which is fixed to one or more covering layers of material of higher strength, for example, by adhering with adhesive. While the core material is frequently of a foamy material, the coatings can comprise any material, for example, wood, wood material, metal, stone, or synthetic stone or even plastic material.

The important lightness of the core materials necessary for many uses is generally obtained by employing materials with air or gas pores, in the core of which the necessary strength for this material is attained through the incoherent blending walls of the pores. This material is, however, not suited for all applications, because it often succumbs to rotting or corrosion so that when the core material has not sufficient stability or durability, the whole material cannot be suitably applied.

A problem of the invention is to provide a composite material of the type described above which has the advantageous properties of metals with respect to rotting and corrosion and therefore is safer against rotting than the known composite material and which, furthermore, is simpler to manufacture and also possesses lightness and high strength.

The invention solves this problem by a composite material of the type described above, wherein the core consists of an uncohered narrow, folded, or crumpled metal foil or filament, and the layers comprise a synthetic adhesive resin, e.g., expoxy resin.

Thus, the material of the core can be more severely consolidated in the area of its surface, e.g. by hammering, striking, rolling or the like, than in its interior region. The core can be provided with punctures, cuts, bores or the like, into which the synthetic adhesive penetrates.

The binding material can be built up as a polylayered material, whereby intermediate layers of synthetic adhesive resin are suitably arranged between the individual layers of cores.

The surface layer can be provided with an altered coating, e.g. through fillers, polishing, spraying, steaming or the like.

The composite material can also consist of a plurality of similar or essentially similar developed individual elements which are combined for a greater surface or greater volume structure and which are connected to one another through adhesive. Thus, individual elements may be joined flush with one another or be notched with one another. They can also be provided with tongue and grooves, pins, dowels, tension tubes or the like.

The material of the invention is simple and easy to manufacture in any desired dimension. Through the random folding or crumpling of metal foils or filaments, a cellular structure with three dimensional reinforcements is attained. Depending on the strength of the compression of the crumpled foil, in any given case, the foil in the surface regions can be stronger than in the inner regions, and the size of the cells and accordingly the strength of the core material can be influenced.

Of especial advantage is that the material of the core has the inherent possibility for plastic forming and the performance of the work of form change. Thus, the new compact material can, for example, provide a bumper for power vehicles which has the normal requirements for high strength, but, however, in the case of a collision if the layered material is destroyed it annuls the kinetic energy through fortified compression. The material operates similarly on being shot at, where the multilayered material annuls kinetic energy of a shot through deformation and the shot is broken down in the layers or so strongly retarded that it can perform no more damage if it penetrates the layers.

The folding or crumpling can be accomplished by any known working process. At the same time, the shape of the core body can accompany the process of folding or crumpling. Thus, it is possible without further details, for example, to press the starting material, e.g., the foil, in a fixed formed cavity in order to produce a certain shape. In this way, a cellular element can be formed which has either quadratic with smooth outer faces or whose outer faces are so formed that adjacent individual elements can enter into key form combination.

The core part formed as disclosed above, is then coated on the outer faces with a resinous adhesive, e.g. of an epoxy resin basis, which enters into the material of the core for inner binding and which yields a sandwich structure of necessary rigid covering layer. Through the cellular structure of the core material, there results a good bonding of the coating material with the core material. A further strengthening of the material can be attained by a puncturing, a slitting of the core which penetrated either only, to the depth of the metal foil or through the whole core and into which the artificial resin adhesive applied to the surface can penetrate so that the whole work piece is intersected.

The artificial resin used for increasing the strength and stiffness of the outer surface can, however, also be employed for bonding several like or similarly formed individual elements together. Thus, there is the ability to build up systematically large formed members of any shape from small and smallest building components. These members, which can be of two or three dimensional form, can be treated at the surface in any way. The members with the hardened artificial resin adhesive coating can be treated at the surface by grinding, by filling in with a spatula, by lacquers, or by coating with other materials.

In a similar way, the new material can also be combined with other materials, e.g. wood, natural or artificial stone, metals, plastic or the like.

The composite material of the invention can be installed for many different functions of different technical domain. Through the choice of different metals, e.g. pure aluminum, copper, steel, gold, alloys thereof, etc., as also high quality adhesive, through structure and size of the structural elements, the manufactured elements can be made with a wide variety of properties in tensile and bending strength, corrosion resistance, density, shock absorption, as well as thermal-physical and chemical behavior. the use of the new composite materials extends from power vehicles, airplanes and ship construction and furniture industries up to dental techniques (filling of tooth cavities) and armament industries.

The invention will now be further explained with the aid of the accompanying drawing showing non-limiting embodiments thereof, In the drawing FIG. 1 shows a rectangular block in three quarter view partly in section, of a new composite material.

FIG. 2 is a view similar to FIG. 1 but showing a block with punctured holes in the core and the penetrating rods of resin therein.

The block 1 consists of a core 2 of crumpled metal foil, e.g. aluminum foil. The thickness of the foil is about 1/10 to 1/100 mm. The compression of the foil material to form the total core varies; the outer regions 2a are more severely compressed than the inner regions 2b. The stronger compression in the region 2a can be obtained, for example, by hammering or rolling.

The core 2 is covered on all sides with a coating 3 of an adherent synthetic resin, e.g., having an epoxy resin basis. The thickness of the coating which enters into the surface of the core 2 to form an intimate bond, amounts to about 1/10 to 1 mm. The thickness of the block itself in the form shown, can be about 1 to 10 mm; its breadth can be about double the thickness and the length can be any length desired. The new composite material can employ foils of such length as to manufacture rods therefrom (FIG. 2). The coating 3 of adhesive synthetic resin serves in the first place to stiffen and strengthen the core material, but this coating, in its fresh state, can also be employed to unite a plurality of such blocks 1 or rods 4 together to form a larger workpiece.

In order to obtain good penetration of the respective cores by the adhesive synthetic resin, the core can be provided with punctures, slits or bores. In the example of the rod 4 of FIG. 2, the various sides of the core 5 are provided with punctures 6, in which the coating material 7 penetrates. In a similar way the core can be provided with slits or bore holes which are penetrated by the resin.

I claim:

1. A composite structural material consisting essentially of a core body formed of closely folded or crushed metal foil or filaments providing a porous structure of low density and strength, and a rigid synthetic resin coating layer of higher density than the core, formed on substantially all the surfaces thereof, whereby the porosity of the core results in good bonding with the coating layer.

2. The composite structural material as claimed in claim 1 wherein the core body has a greater density and is less porous in the surface regions adjacent the coating layer than in the interior thereof.

* * * * *